(12) United States Patent
Boda et al.

(10) Patent No.: US 9,337,669 B2
(45) Date of Patent: May 10, 2016

(54) SYSTEM AND METHOD FOR CHARGING AN ENERGY SOURCE OF A PORTABLE ELECTRONIC DEVICE

(71) Applicant: RESEARCH IN MOTION LIMITED, Waterloo (CA)

(72) Inventors: Mallikarjun Boda, Irving, TX (US); Jace William Files, Irving, TX (US); Jonathan Quinn Brubacher, Waterloo (CA); Yu William Feng, Waterloo (CA)

(73) Assignee: BlackBerry Limited, Waterloo (CA)

(*) Notice: Subject to any disclaimer, the term of this patent is extended or adjusted under 35 U.S.C. 154(b) by 577 days.

(21) Appl. No.: 13/762,875

(22) Filed: Feb. 8, 2013

(65) Prior Publication Data
US 2014/0225574 A1  Aug. 14, 2014

(51) Int. Cl.
*H02J 7/16* (2006.01)
*H02J 7/00* (2006.01)

(52) U.S. Cl.
CPC ............. *H02J 7/0014* (2013.01); *H02J 7/0013* (2013.01); *H02J 7/0026* (2013.01); *H02J 2007/0037* (2013.01); *Y10T 307/555* (2015.04)

(58) Field of Classification Search
CPC ..................................................... Y02E 60/12
USPC ......................................................... 320/162
See application file for complete search history.

(56) References Cited

U.S. PATENT DOCUMENTS

| | | | |
|---|---|---|---|
| 5,874,823 A | 2/1999 | Suzuki | |
| 7,414,381 B2 | 8/2008 | Popescu-Stanesti et al. | |
| 7,839,117 B2 | 11/2010 | Elder et al. | |
| 2008/0059089 A1* | 3/2008 | Hornick | H02J 7/0063 702/63 |
| 2010/0079108 A1 | 4/2010 | Monden | |
| 2010/0085014 A1 | 4/2010 | Saeki | |
| 2012/0119749 A1 | 5/2012 | Iida | |

OTHER PUBLICATIONS

European Patent Application No. 13154640.0, European Search Report dated Jul. 23, 2013.
European Patent Application No. 13154640.0, Examination Report dated Jan. 20, 2014.
European Patent Application No. 13154640.0-1804, Intention to Grant dated Oct. 1, 2015.

* cited by examiner

*Primary Examiner* — Suresh Memula
(74) *Attorney, Agent, or Firm* — Louis B. Allard; Borden Ladner Gervais LLP

(57) ABSTRACT

A method and system to charge efficiently and safely batteries that power an electronic device and are comprised in an electronic device. The method and system performs measurement of electrical currents flowing in different branches of an electrical circuit that comprises the batteries and determines if there if there is a battery connection fault. The charge current used to charge the batteries is adjusted in accordance with the detected fault or absence thereof, in order not to exceed a safe current limit.

13 Claims, 14 Drawing Sheets

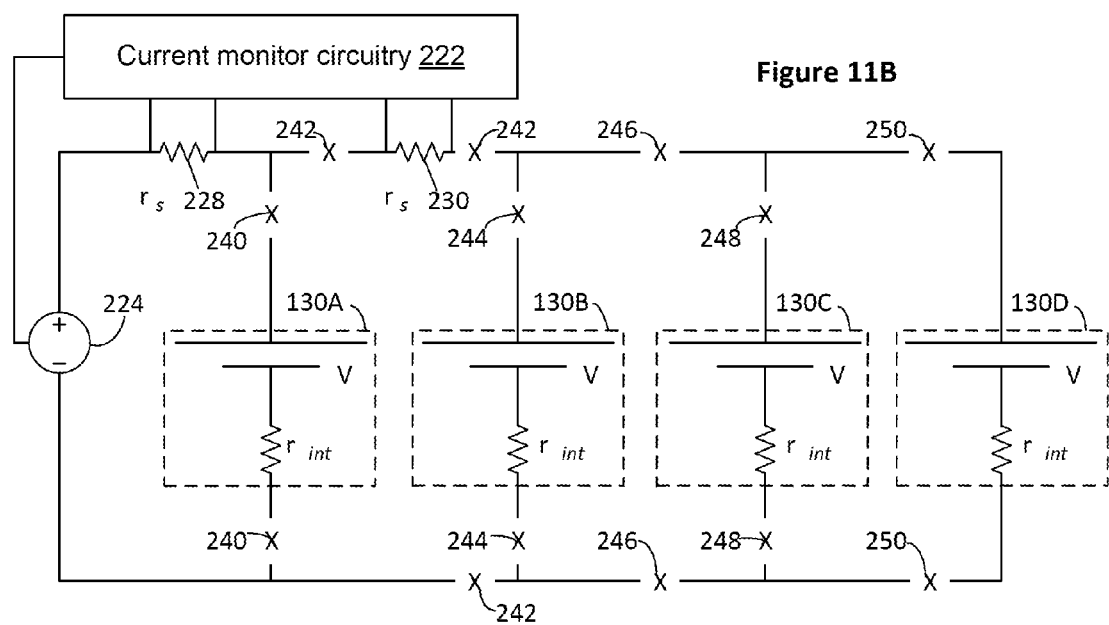

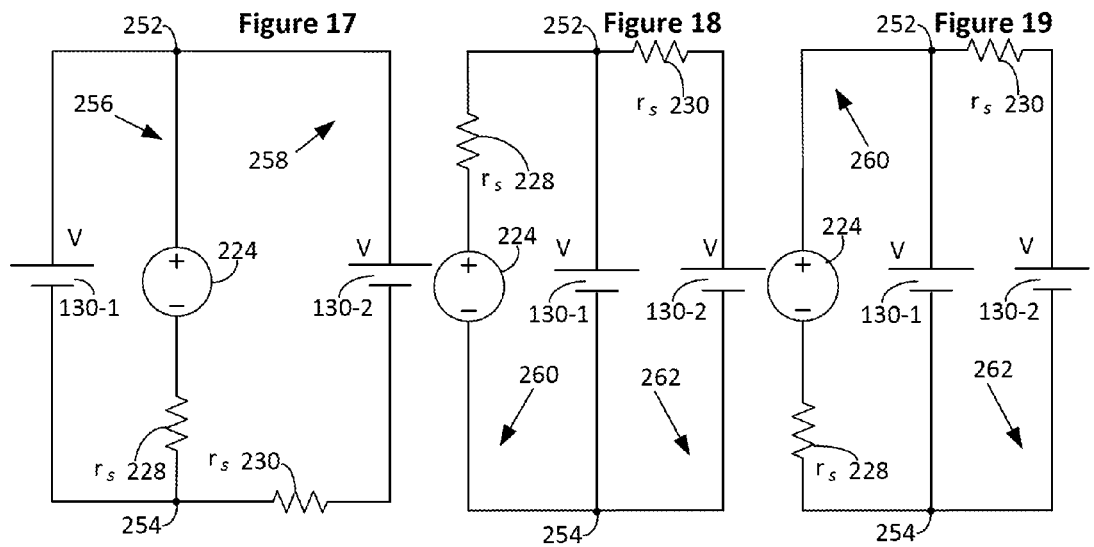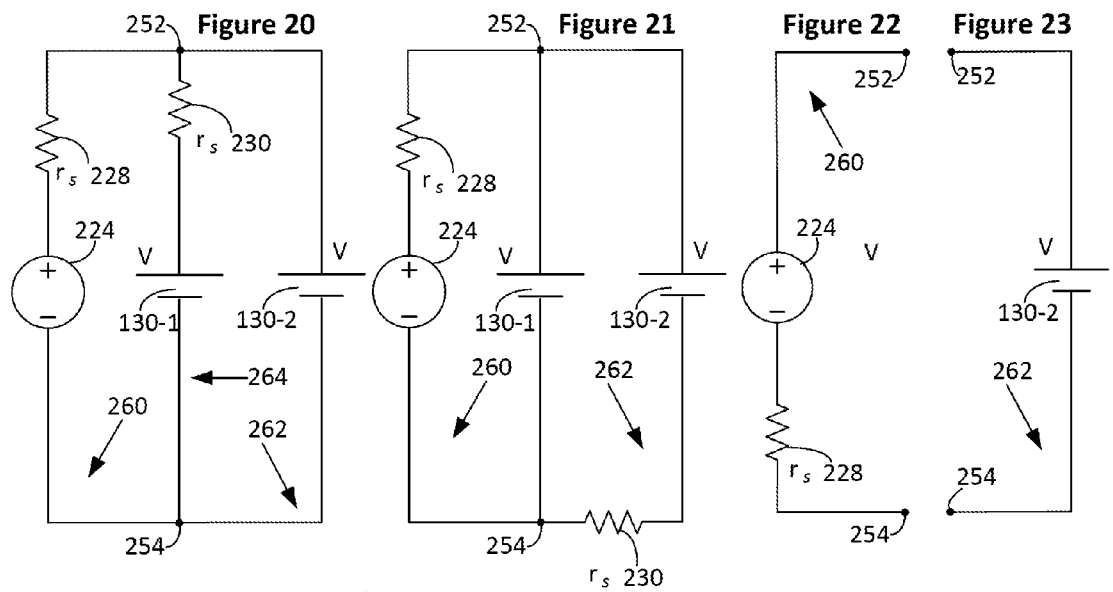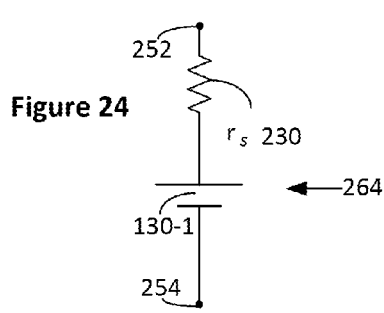

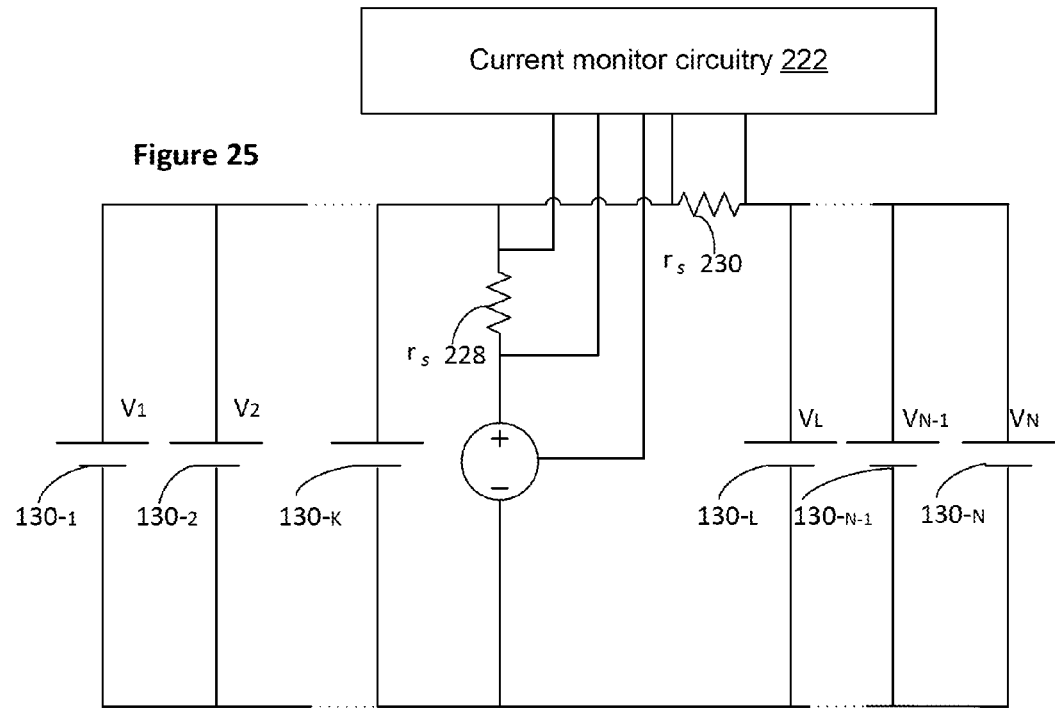
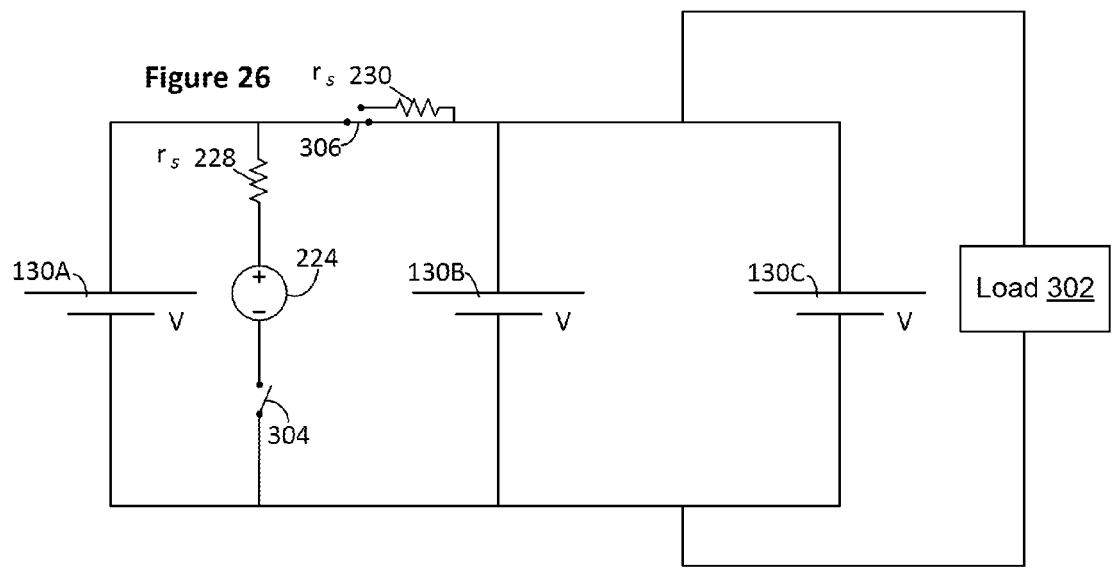

SYSTEM AND METHOD FOR CHARGING AN ENERGY SOURCE OF A PORTABLE ELECTRONIC DEVICE

FIELD OF THE DISCLOSURE

The present disclosure relates generally to electronic devices. More particularly, the present disclosure relates to electronic devices powered by multiple rechargeable energy sources.

BACKGROUND OF THE DISCLOSURE

Present day electronic devices, particularly portable electronic devices such as, for example, smart phones and tablets can be equipped with a battery unit that comprises multiple rechargeable batteries or cells. The rechargeable batteries are electrically connected to each other to provide (or supply) an output voltage used to run the electronic device. Recharging of the battery unit requires providing a charge current to the battery unit. The maximum allowable value of the charge current is determined in accordance with the arrangement of the rechargeable cells, i.e., how they are electrically connected to each other, and in accordance with safety measures such as, for example, those set out by the International Association for the Wireless Communication Industry (CTIA), to ensure safety during the recharging process.

For example, under such safety measures, an electronic device powered by a battery unit having multiple rechargeable same cells electrically connected to each other, for example, in parallel could have, as its maximum allowable charge current, the maximum allowable charge current for a single cell. This would ensures that in the case where the multiple rechargeable cells become electrically disconnected and only one rechargeable cell remains connected to the recharging unit, that the charge current would still be safe for that single remaining cell. However, having this "safe" charge current leads to long recharging times particularly when all the rechargeable cells are in place and electrically connected to each other.

Improvements in portable devices that have a battery unit with multiple, electrically connected rechargeable cells are therefore desirable.

BRIEF DESCRIPTION OF THE DRAWINGS

Embodiments of the present disclosure will now be described, by way of example only, with reference to the attached Figures, wherein:

FIG. 11B shows a four-battery example of the embodiment of FIG. 11A.

FIGS. 15-17 show alternate arrangements of electrical components in the two closed loops of FIG. 12.

FIG. 18 shows a pair of closed loops from the general embodiment of FIG. 11.

FIGS. 19-21 show alternate arrangements of electrical components in the two closed loops of FIG. 18.

FIGS. 22-24 shows current branches taken from the two closed loops of FIG. 20.

FIG. 25 shows another general embodiment of a battery arrangement in accordance with the present disclosure.

FIG. 26 shows an embodiment of a battery arrangement connected to a load, the battery arrangement includes switching devices used to electrically connect a controllable current charge device and sense resistors to the battery arrangement.

DETAILED DESCRIPTION

Figure 1:
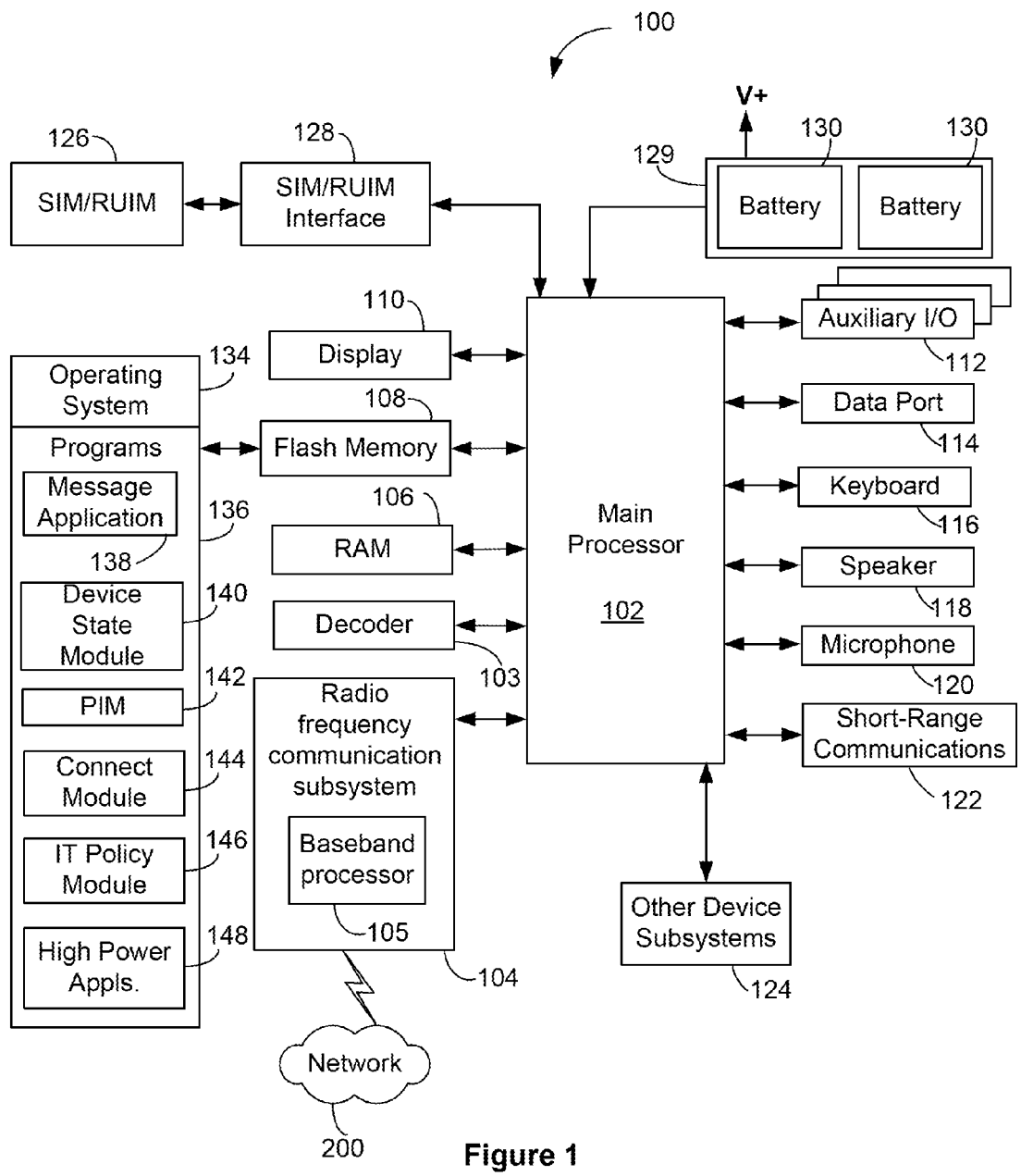
FIG. 1 shows a block diagram example of a portable electronic device.

Generally, the present disclosure provides a method and system to charge efficiently and safely batteries comprised in an electronic device. The method and system performs measurement of electrical currents flowing in different branches of an electrical circuit that comprises the batteries and determines if there if there is a battery connection fault. The charge current used to charge the batteries is adjusted in accordance with the detected fault, or absence thereof, such as to ensure that the charge current received by each battery does not exceed a safe current limit.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein.

Also, the description is not to be considered as limiting the scope of the embodiments described herein.

The embodiments described herein generally relate to portably powered (typically, but not exclusively, battery-powered) electronic devices such as, for example, portable electronic devices. The portable electronic devices can be mobile communication devices, cellular phones, cellular smartphones, wireless communication devices, tablet computers (which can be referred to simply as tablets) and the like, personal digital assistants (PDAs), cameras, calculators, mobile gaming devices, personal audio/video devices, etc. Such portable electronic devices may be handheld, that is, sized and shaped to be held and carried in a human hand, and used while held or carried.

A portable electronic device can be a two-way communication device with data communication capabilities including the capability to communicate with other mobile devices or computer systems through a network of transceiver stations. The portable electronic device, which may be referred to as a mobile device, may also have the capability to allow voice communication. Depending on the functionality provided by the mobile device, it may be referred to as a data messaging device, a two-way pager, a cellular telephone with data messaging capabilities, a wireless Internet appliance, or a data communication device. To aid the reader in understanding the structure of the mobile device, reference will now be made to FIG. 1.

Shown in FIG. 1, is a block diagram of an exemplary embodiment of a portable electronic device 100. The portable electronic device 100 includes a number of components such as a main processor 102 that controls the overall operation of the portable electronic device 100. Communication functions, including data and voice communications, are performed through a radio frequency (RF) communication subsystem 104. Data received by the portable electronic device 100 can be decompressed and decrypted by decoder 103, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The RF communication subsystem 104 receives messages from, and sends messages to, a wireless network 200. In this exemplary embodiment of the portable electronic device 100, the RF communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the RF communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications. The RF communication subsystem 104 can comprise a baseband processor 105 that manages the functions of the communication system 104.

Although the wireless network 200 associated with portable electronic device 100 is a GSM/GPRS wireless network in one exemplary implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include Wi-Fi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122, a battery pack 129, and other device subsystems 124. The display 110 can include a touch-sensitive display.

Some of the subsystems of the portable electronic device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The portable electronic device 100 can send and receive communication signals over the wireless network 200 after required network registration or activation procedures have been completed. Network access is associated with a subscriber or user of the portable electronic device 100. To identify a subscriber, the portable electronic device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the portable electronic device 100 and to personalize the portable electronic device 100, among other things. Without the SIM/RUIM card 126, the portable electronic device 100 is not fully operational for communication with the wireless network 200. By inserting the SIM/RUIM card 126 into the SIM/RUIM interface 128, a subscriber can access all subscribed services. Services may include: web browsing and messaging such as e-mail, voice mail, Short Message Service (SMS), and Multimedia Message Service (MMS). More advanced services may include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical portable electronic device. The SIM/RUIM card 126 may store additional subscriber information for a portable electronic device as well, including datebook (or calendar) data and recent call data. Alternatively, user identification data and other data items can also be programmed into the flash memory 108.

The portable electronic device 100 is a battery-powered device that includes the battery pack 129, which contains, among other components, two or more rechargeable electrical energy sources such as, for example, batteries 130. In at least some embodiments, the batteries 130 can be smart batteries with an embedded microprocessor that can communicate with the main processor 102 and that can control operations related to the batteries. The battery assembly can provide a voltage V+ to the portable electronic device (e.g., V+ can be provided to the main processor 102, or to any other power-consuming component of the portable electronic device 100). Although current technology makes use of batteries, future technologies such as micro fuel cells or capacitor-based power supplies may provide the power to the portable electronic device 100. As will be understood by the skilled worker, batteries, micro fuel cells, capacitor-based based power supplies, or any other device that can produce an electrical output usable by the portable electronic device 100, can all be referred to as electrical energy sources, which may be rechargeable.

The portable electronic device 100 also includes an operating system 134 and software components 136 to 146 which are described in more detail below. The operating system 134 and the software components 136 to 148 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar events, appointments, and task items. The PIM 142 can also organize and manage any voice mails recorded on the portable electronic device 100. A PIM application has the ability to send and receive data items via the wireless network 200. PIM 142 data items may be seamlessly integrated, synchronized, and updated via the wireless network 200 with the portable electronic device subscriber's corresponding data items stored in, or accessible by, a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, that the portable electronic device 100 is authorized to interface with.

The connect module 144 includes a set of application programming interfaces (APIs) that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass information technology (IT) policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

The subset of software applications 136 can also include high power applications 148. Examples of such high power applications include, for example, three-dimensional gaming, web browsing, video conference calling, and video recording.

Other types of software applications can also be installed on the portable electronic device 100. These software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary input/output (I/O) subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the RF communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 may be an alphanumeric keyboard, a telephone-type keypad, or both. Alternatively, instead of having a keyboard 116, keyboard functionality can be provided to the user through a touch-sensitive display that may be included in the display 110. Other types of keyboards may also be used. A composed item may be transmitted over the wireless network 200 through the RF communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

The scope of the present disclosure encompasses the detection of electrical connection faults in arrangements of electrical energy sources electrically connected to each other. The detection of such faults allows in, in some embodiments, to adjust a charge current being supplied to the electrical energy sources to charge the electrical energy sources. In other embodiments, detection of such faults allows to adjust a supply current being supplied, by the electrical energy sources, to an electrical load.

Figure 2:
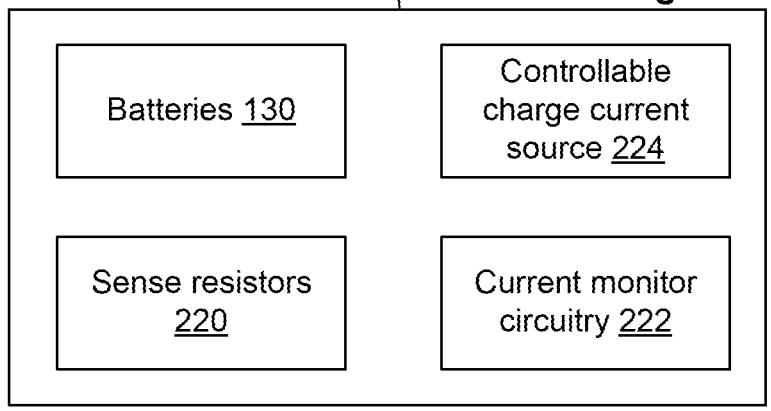
FIG. 2 shows a battery pack in accordance with embodiment of the present disclosure.

FIG. 2 shows an example of a battery pack 129 of the present disclosure. The battery pack 129 comprises batteries 130, sense resistors 220, current monitor circuitry 222, and controllable charge current source 224, which can also be referred to as an electrical current source. As will be discussed in greater detail below, the sense resistors 220 and the current monitor circuitry 222 are used to measure (monitor) electrical current flowing in various branches in the electrical circuitry of the battery pack 129. By measuring these current, it is possible to detect connection fault of the batteries in the battery pack 129 (i.e., it is possible to detect if a battery has been disconnected). The controllable charge current source 224 controls the level of a charge current provided to charge (recharge) the batteries 130 in accordance with the measured currents. The controllable charge current source 224 takes an electrical charge signal provided by a charge source, which is exterior to the portable electronic device 100, and adjusts, according to current values sensed at the sense resistors 220, the charge current provided to the batteries 130. The charge current provided to the batteries can be set in accordance with safety measures to avoid any of the batteries being subjected to a charge current greater than its maximum allowable charge current.

Figure 3:
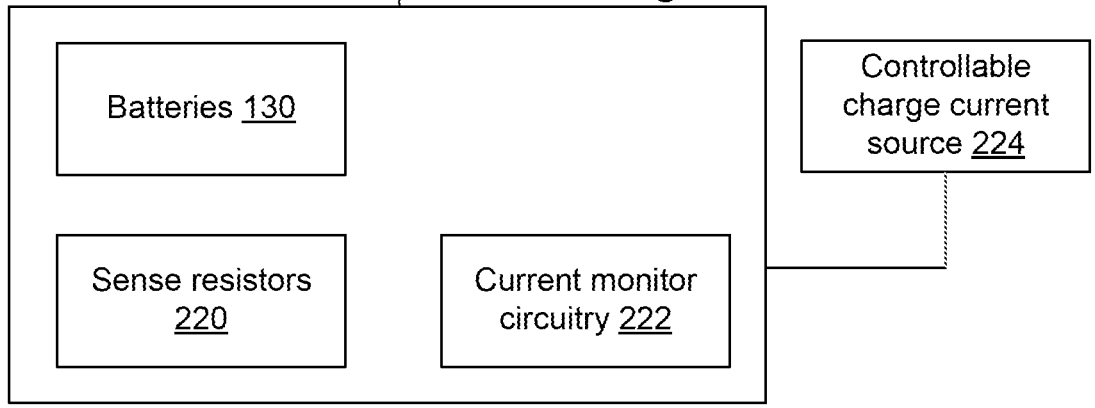
FIG. 3 shows a battery pack and charge controller circuitry in accordance with other embodiments of the present disclosure.

Alternatively, not all the components of the battery pack 129 shown in FIG. 2 need to be disposed (located) in the battery pack 129. FIG. 3 shows another example of a battery pack 129 that has the controllable charge current source 224 located outside the battery pack 129. That is, the controllable charge current source 224 is located elsewhere in the portable electronic device 100. The current monitoring circuitry can include the processor 102 shown at FIG. 1, which can receive sensed (monitored) current values from current sensing circuitry through any suitable communication protocol such as, for example, the $I^2C$ protocol, 1wire bus, system management bus (SMBUS), or the like. In accordance with (as a function of) the sensed current values, the processor 102 can control the controllable charge current source 224 shown at FIGS. 2 and 3.

Figure 4:
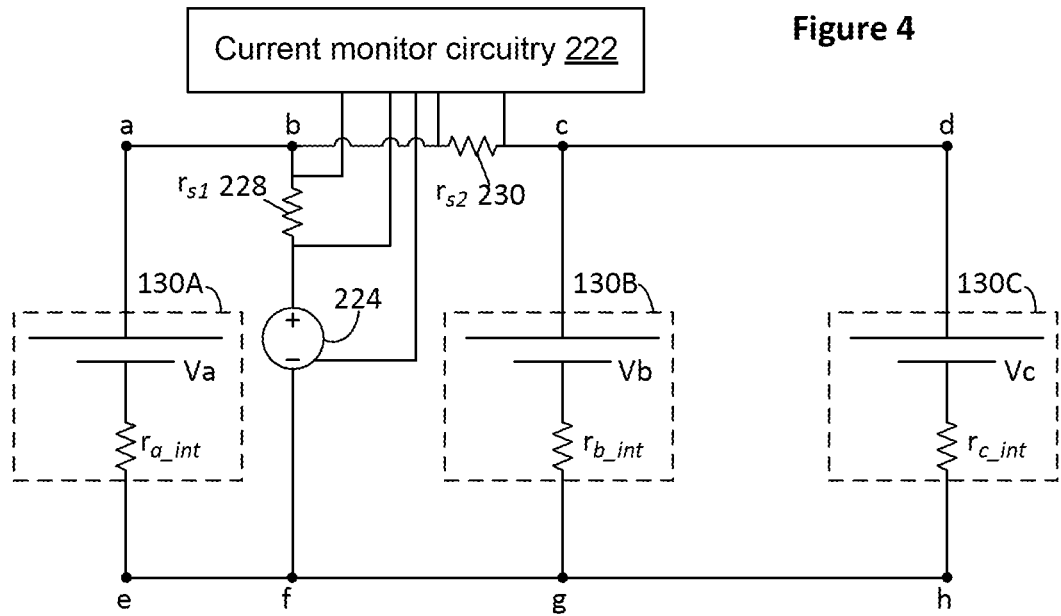
FIG. 4 shows a battery arrangement in accordance with embodiments of the present disclosure.

In accordance with the present disclosure, FIG. 4 shows an example of an arrangement of three batteries 130A, 130B, and 130C in the battery pack 129 of FIG. 3. In FIG. 4, the batteries 130A, 130B, and 130C have nominal voltages Va, Vb, and Vc, and internal resistance values $r_{a\_int}$, $r_{b\_int}$, and $r_{c\_int}$ respectively. The batteries 130A, 130B, and 130C are electrically connected to the controllable charge current source 224 and to sense resistors $r_{s1}$ 228 and $r_{s2}$ 230. The controllable charge current source 224 provides a charge current in accordance with a control signal provided by the current monitor circuitry 222. As will be described in greater detail below, the control signal can be a function of current values sensed by the current monitor circuitry 222 at sense resistors $r_{s1}$ 228 and $r_{s2}$ 230, or can be a function of the ratio of current flowing through sense resistors $r_{s1}$ 228 and $r_{s2}$ 230. The sense resistors $r_{s1}$ 228 and $r_{s2}$ 230 can have any suitable resistance values. For example, the resistance value of each sense resistor can be any value ranging from 10 to 100 mΩ, or any other value that produces a measurable voltage drop. In some embodiments, the voltage drop across the sense resistor can be considerably less that the voltage of a battery and, does not cause excessive resistive losses. The batteries 130B and 130C are electrically connected to each other in parallel. In the embodiment of FIG. 4, the positive electrodes of the batteries 130B and 130C are electrically connected to one end of the sense resistors $r_{s2}$ 230. The negative electrodes of the batteries 130B and 130C are electrically connected to the negative electrode of the battery 130A and to the negative electrode of controllable charge current source 224. The positive electrode of the battery 130A is electrically connected to the sense resistors $r_{s1}$ 228 and to the sense resistor $r_{s2}$ 230. The sense resistor $r_{s1}$ 228 is connected to the positive electrode of controllable charge current source 224. The batteries 130A, 130B, and 130C can have any suitable nominal voltage and be based upon any suitable battery chemistry. Each battery can have a voltage different than that of the other batteries. Embodiments where one, or more than one of the individual batteries 130A, 130B, and 130C would be replaced by an arrangement of batteries electrically connected to each other (e.g., in series or in parallel) in any suitable configuration, are also within the scope of the present disclosure.

Also shown in FIG. 4 are three closed loops, namely the closed loop defined by the nodes a-b-f-e, the closed loop defined by the nodes b-c-g-f, and the closed loop defined by the nodes c-d-h-g. A closed loop can also be referred to as Kirchhoff loop. As such, the embodiment of FIG. 4 shows that the controllable charge current source 224, the sense resistor 228, the sensor resistor 230, the battery 130A, and the battery 1306 are electrically connected to each other and define a first closed loop (a-b-f-e) and a second closed loop (b-c-g-f). In the present embodiment, the first closed loop (a-b-f-e) comprises the controllable charge current source 224, the sense resistor 228, and the battery 130A. Also in the present embodiment, the second closed loop (b-c-g-f) comprises the controllable charge current source 224, the sense resistor 228, the sense resistor 230, and the battery 130B. As will be discussed below in more detail, the sense resistor 228 and the sense resistor 230 or on different (distinct) current branches.

Figure 5:
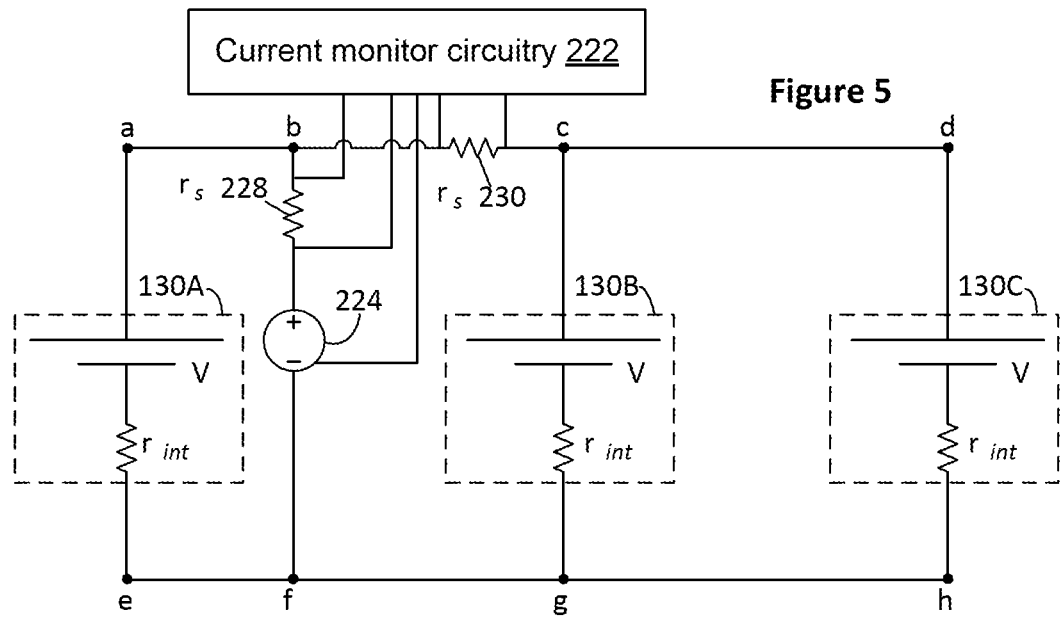
FIG. 5 shows another battery arrangement in accordance with embodiments of the present disclosure.

FIG. 5 shows an embodiment of the example of FIG. 4 with the nominal voltages Va, Vb, and Vc having the same value V; with the internal resistance values $r_{a\_int}$, $r_{b\_int}$, and $r_{c\_int}$ having same value $r_{int}$; and with the sense resistors $r_{s1}$ 228 and $r_{s2}$ 230 having the same value $r_s$. In accordance with Kirchhoff's circuit laws (sometimes also called Kirchhoff's voltage law and Kirchhoff's current law), it can be shown that, in the example of FIG. 5, when a charge current is provided by the charge control circuitry 224, the current flowing through $r_s$ 230, $I(r_s\ 230)$, is equal to two thirds the current flowing through $r_s$ 228, $I(r_s\ 230)$. That is, when the voltage of each of the batteries 130A, 130B, and 130B have the same value, and when the internal resistance of each of the three batteries is the same, and when the value of the two sense resistors 228 and 230 are the same, then $I(r_s\ 230)=2*I(r_s\ 228)/3$. As is known in the art, the internal resistance can be referred to as an equivalent series resistance. Although the resistance of the sense resistors 228 and 230 is the same in the present example, this need not be the case. In examples where the resistance value of the sense resistors 228 and 230 is different, a different relation between $I(r_s\ 230)$ and $I(r_s\ 228)$ will exist and be equally indicative that no faults are present.

Figure 6:
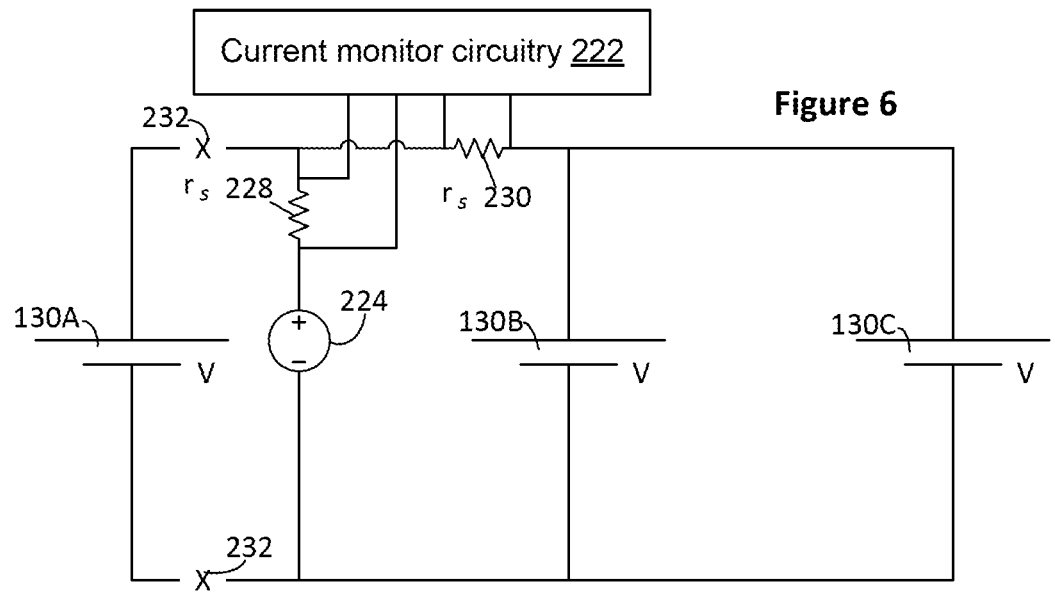
FIG. 6 shows the battery arrangement of FIG. 5 with a first example of connection faults.

FIGS. 6-9 show how faults can be detected in the battery arrangement of FIG. 5. For clarity purposes, the internal resistances of the batteries are assumed equal among themselves and are not shown and, the nodes a through h are not shown in FIGS. 6-9. FIG. 6 shows the electrical circuit of FIG. 5 but with two faults 232 between the battery 130A and the remainder of the electrical components in the electrical circuit. Each fault 232 is a break in the electrical connection between the battery 130A and the remainder of the electrical circuit. Such a break in connection could occur, for example, when the battery 130A is electrically connected to the controllable charge current circuitry 224 through a flex connector that becomes broken or damaged. Clearly, and as can be shown through Kirchhoff's circuit laws, when at least one of the faults 232 is present, and there are no other faults in the battery arrangement, $I(r_s\ 230)=I(r_s\ 228)$.

Figure 7:
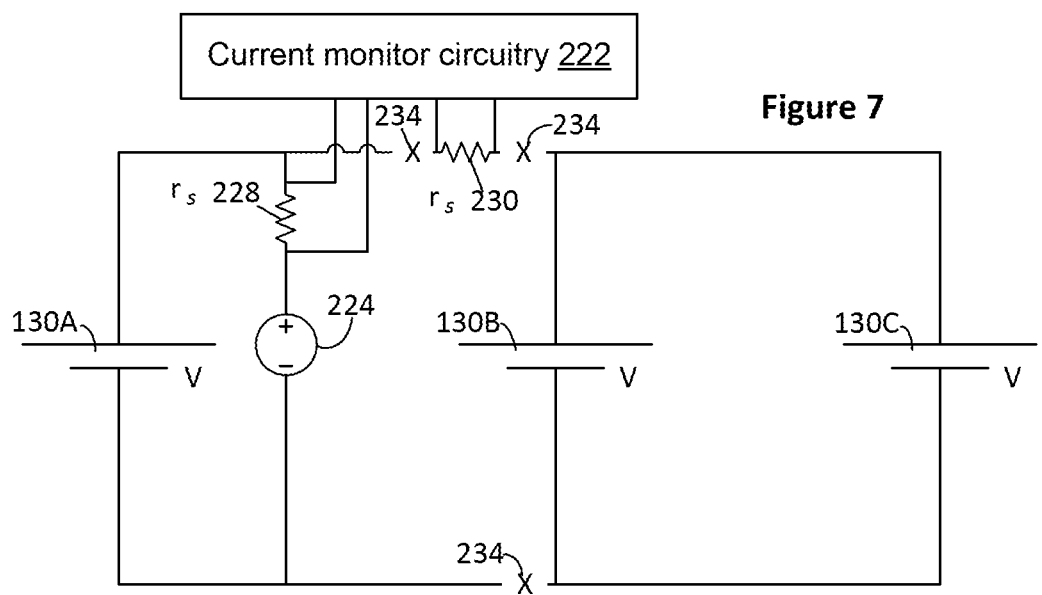
FIG. 7 shows the battery arrangement of FIG. 5 with a second example of connection faults.

FIG. 7 shows three faults 234 between the batteries 130B and 130C, and the remainder of the electrical components of the electrical circuit. Each fault 234 is a break in the electrical connection between the batteries 130A and 130B and the remainder of the electrical circuit. Clearly, when at least one of the faults 234 is present, no electrical current will flow in sense resistor 230; that is, $I(r_s\ 230)=0$.

Figure 8:
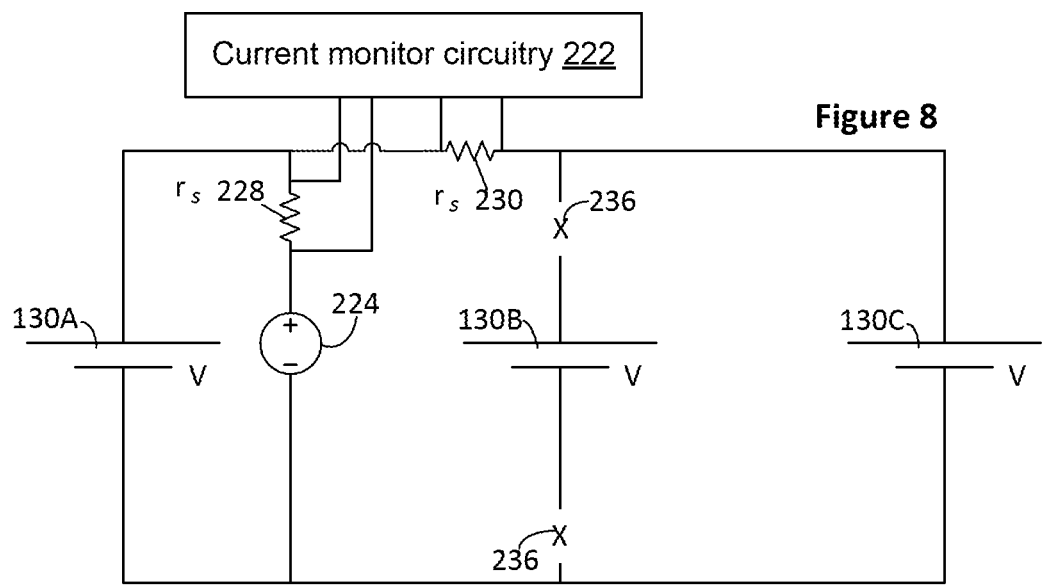
FIG. 8 shows the battery arrangement of FIG. 5 with a third example of connection faults.

FIG. 8 shows two faults 236 between the battery 130B and the remainder of the electrical components of the electrical circuit. Each fault 236 is a break in the electrical connection between the batteries 130B and the remainder of the electrical circuit. By using Kirchhoff's circuit laws, it can be shown that when at least one of the faults 236 is present, and there are no other faults in the battery arrangement, $I(r_s\ 230)=0.5I(r_s\ 228)$.

Figure 9:
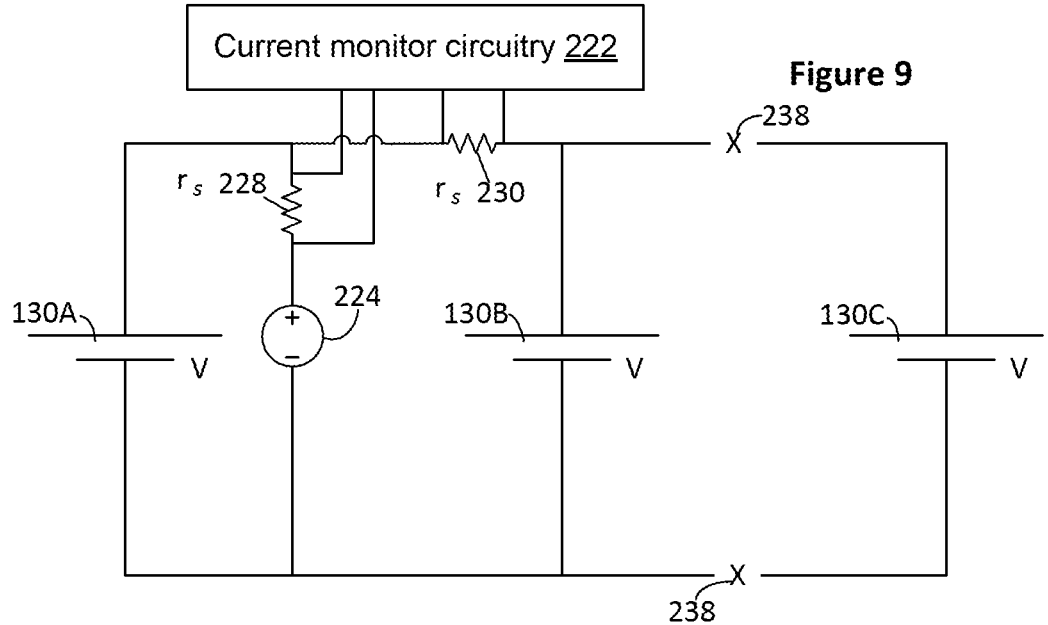
FIG. 9 shows the battery arrangement of FIG. 5 with a fourth example of connection faults.

FIG. 9 shows two faults 238 between the battery 130C and the remainder of the electrical components of the electrical circuit of FIG. 9. Each fault 238 is a break in the electrical connection between the batteries 130C and the remainder of the electrical circuit. By using Kirchhoff's circuit laws, it can be shown that when at least one of the faults 238 is present, and there are no other faults in the batter arrangement, $I(r_s\ 230)=0.5I(r_s\ 228)$.

Table 1 summarizes the above relationships between the currents $I(r_s\ 230)$, $I(r_s\ 228)$, and the various faults 232-238.

TABLE 1

| Fault | Current relationship |
| --- | --- |
| No fault | $I(r_s\ 230) = 2*I(r_s\ 228)/3$ |
| 232 | $I(r_s\ 230) = I(r_s\ 228)$ |
| 234 | $I(r_s\ 230) = 0$ |
| 236 | $I(r_s\ 230) = 0.5\ I(r_s\ 228)$ |
| 238 | $I(r_s\ 230) = 0.5\ I(r_s\ 228)$ |
| 232 and 236 | $I(r_s\ 230) = I(r_s\ 228)$ |
| 232 and 238 | $I(r_s\ 230) = I(r_s\ 228)$ |

The faults can be caused by a break in a flex circuit or any other type of electrical conductor connecting the electrical components of the electrical circuits shown at FIGS. 4-9.

The current monitor circuitry 222 can monitor $I(r_s\ 230)$ and $I(r_s\ 228)$ and adjust the charge current provided by the charge controller circuitry 224 as follows. The current monitoring circuitry can monitor $I(r_s\ 230)$ and $I(r_s\ 228)$ continuously, periodically, or in any other suitable way. For example, when the maximum charge current of each of the batteries 130A, 130B, and 130C is the same and equal to $I_{max}$, and when the current monitor circuitry 222 monitors (senses) that there are no faults by measuring $I(r_s\ 230)=2*I(r_s\ 228)/3$, the current monitor circuitry 222 will communicate this information to the charge controller circuitry 224, which will set the charge current such that each battery draws a current of $I_{max}$. That is, to the charge controller circuitry 224 will provide a charge current of to $3*I_{max}$. This allows for rapid charging (recharging) of the batteries.

Further, when the current monitor circuitry 222 monitors (senses) that $I(r_s\ 230)=I(r_s\ 228)$, that is, when there is at least one fault 232, the current monitor circuitry 222 will communicate this information to the charge controller circuitry 224, which will set the charge current to a value such that each battery apt to receive current receive its maximum charge current Imax. That is, the charge controller circuitry 224 will provide a charge current of $2*I_{max}$.

Furthermore, when the current monitor circuitry 222 monitors (senses) that $I(r_s\ 230)=0$, that is, when there is at least one fault 234, the current monitor circuitry 222 will communicate this information to the charge controller circuitry 224, which will set the charge current to $I_{max}$, as there is only one battery to be charged.

Additionally, when the current monitor circuitry 222 monitors (senses) that $I(r_s\ 230)=0.5I(r_s\ 228)$, that is, when there is at least one fault 236 or at least one fault 238, the current monitor circuitry 222 will communicate this information to the charge controller circuitry 224, which will set the charge current to $2*I_{max}$.

When a fault 232 and a fault 236 are present, i.e., when only the battery 130B is electrically connected to the controllable charge current circuitry 224, the maximum charge current should be set to $I_{max}$ in order not to exceed the safe charge current limit. Similarly, when a fault 232 and a fault 238 are present, the maximum charge current should be set to $I_{max}$.

However, as the measured current relationship, $I(r_s\ 230)=I(r_s\ 228)$, is the same whether there is a fault 232, or two faults 232 and 236, or 232 and 238, it would be safer to set the charge current to $I_{max}$ at all times when $I(r_s\ 230)=I(r_s\ 228)$ is observed. Additional sense resistors may be added to other distinct branches of the electrical circuit. Monitoring, by the current monitor circuitry 222, of the electrical current flowing through these additional resistors would allow determining if in fact more than one fault is present. Such additional resistors and branches are optional, however; it may be satisfactory in some cases to determine that a fault has occurred—and notifying a user of a fault prompting a repair to be made—and it may be less important to determine how many faults have occurred or what the particular faults may be.

Table 2 summarizes the above relationships between $I(r_s\ 230)$, $I(r_s\ 228)$, and the charge current.

TABLE 2

| Fault | Measured current relationship | Charge current |
|---|---|---|
| No fault | $I(r_s\ 230) = 2*I(r_s\ 228)/3$ | $3*I_{max}$ |
| 232 | $I(r_s\ 230) = I(r_s\ 228)$ | $2*I_{max}$ |
| 234 | $I(r_s\ 230) = 0$ | $I_{max}$ |
| 236 | $I(r_s\ 230) = 0.5\ I(r_s\ 228)$ | $2*I_{max}$ |
| 238 | $I(r_s\ 230) = 0.5\ I(r_s\ 228)$ | $2*I_{max}$ |
| 232 and 236 | $I(r_s\ 230) = I(r_s\ 228)$ | $I_{max}$ |
| 232 and 238 | $I(r_s\ 230) = I(r_s\ 228)$ | $I_{max}$ |

Monitoring the individual current flowing through the sense resistors 228 and 230, can include monitoring the ratio of the currents flowing through sense resistors 228 and 230. The current monitoring circuitry 222 may be equipped with current dividing circuitry that take the current values measured at the sense resistors 228 and 230 as inputs, and outputs the ratio of the current values.

Figure 10:
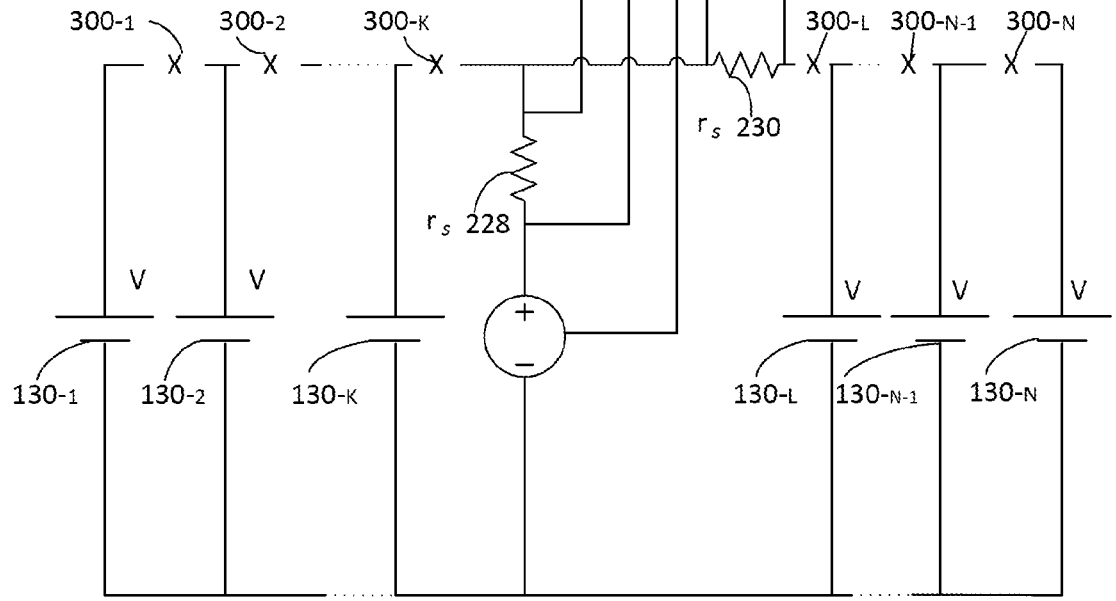
FIG. 10 shows a general embodiment of a battery arrangement in accordance with the present disclosure, and also shows examples of connection faults.

FIG. 10 show an embodiment of an arrangement of N batteries 130-1 to 130-N. FIG. 5 is a specific embodiment of FIG. 10 with N=3. In FIG. 10, there are K batteries to the left of sense resistor 228, and N–K batteries to the right of sense resistor 228. In this embodiment, it can be shown that for any of the faults 300-1 to 300-K, the current flowing through sense resistor $r_s$ 228 and the current flowing through the sense resistor $r_s$ 230 are related as per:

$$I(r_s 230) = \left[\frac{N-M}{N-a}\right] \times I(r_s 228) \text{ for } a \in [1, K]$$

where a corresponds to fault 300-a.

It can also be shown that for any of the faults 300-L to 300-N, the current flowing through sense resistor $r_s$ 228 and the current flowing through the sense resistor $r_s$ 230 are related as per:

$$I(r_s 230) = \left[\frac{b-L}{b-1}\right] \times I(r_s 228) \text{ for } b \in [L, N]$$

where b corresponds to fault 300-b.

Figure 11A:
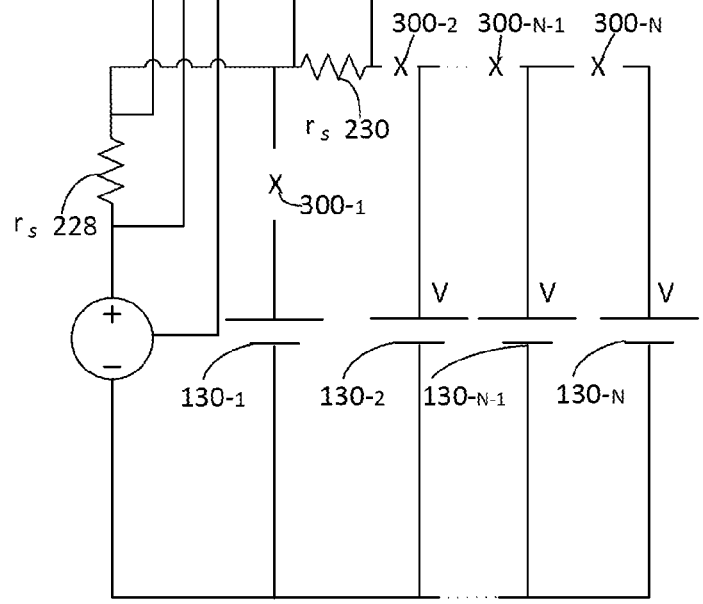
FIG. 11A shows another general embodiment of a battery arrangement in accordance with the present disclosure, and also shows examples of connection faults.

FIG. 11A shows another embodiment of an arrangement of N batteries 130-1 to 130-N. It can be shown that for any of the faults 300-2 to 300-N, the current flowing through sense resistor $r_s$ 228 and the current flowing through the sense resistor $r_s$ 230 are related as per:

$$I(r_s 230) = \left[\frac{c-2}{c-1}\right] \times I(r_s 228) \text{ for } c \in [2, N]$$

where c corresponds to fault 300-c. In the case where fault 300-1 were to occur, $I(r_s\ 230)=I(r_s\ 228)$.

FIG. 11B shows an example of the embodiment of FIG. 11A with four batteries 130A, 130B, 130C, and 130D in the battery pack 129 of FIG. 2. In FIG. 11B, the batteries 130A, 130B, 130C, and 130D have the same nominal voltage V, and the same internal resistance value $r_{int}$. The batteries 130A, 130B, 130C, and 130D are electrically connected to the charge controller circuitry 224 and to sense resistors $r_s$ 228 and $r_s$ 230, which have substantially the same resistance value. The charge controller circuitry 224 provides a charge current in accordance with a control signal provided by the current monitor circuitry 222, the control signal is a function of current values sensed at sense resistors $r_s$ 228 and $r_s$ 230. The batteries 130B, 130C, and 130D are electrically connected in parallel. The battery 130A is connected to the batteries 130B, 130C, and 130D through the sense resistor $r_s$ 230. The charge controller circuitry 224 is electrically connected to the batteries 130A, 130B, 130C, and 130D and to the sense resistor $r_s$ 230, through the sense resistor $r_s$ 228.

FIG. 11B also shows faults 240, 242, 244, 246, 248, and 250. The relationship between current flowing through $r_s$ 230, $I(r_s\ 230)$, and the current flowing through $r_s$ 230, $I(r_s\ 228)$, is as follows. When there are no faults, $I(r_s\ 230)=3*I(r_s\ 228)/4$; when there is at least one fault 240, and there are no other faults in the batter arrangement, $I(r_s\ 230)=I(r_s\ 228)$; when there is at least one fault 242, $I(r_s\ 230)=0$; when there is at least one fault 244, and there are no other faults in the batter arrangement, $I(r_s\ 230)=2*I(r_s\ 228)/3$; when there is at least one fault 246, and no faults 240, 242 or 244, $I(r_s\ 230)=0.5I(r_s\ 228)$; when there is at least one fault 248, and no other faults in the batter arrangement, $I(r_s\ 230)=2*I(r_s\ 228)/3$; and when there is at least one fault 250, and there are no other faults in the batter arrangement, $I(r_s\ 230)=2*I(r_s\ 228)/3$. Table 3 summarizes these relationships.

TABLE 3

| Fault | Current relationship |
|---|---|
| No fault | $I(r_s\ 230) = 3*I(r_s\ 228)/4$ |
| 240 | $I(r_s\ 230) = I(r_s\ 228)$ |
| 242 | $I(r_s\ 230) = 0$ |
| 244 | $I(r_s\ 230) = 2*I(r_s\ 228)/3$ |
| 246 | $I(r_s\ 230) = 0.5\ I(r_s\ 228)$ |
| 248 | $I(r_s\ 230) = 2*I(r_s\ 228)/3$ |
| 250 | $I(r_s\ 230) = 2*I(r_s\ 228)/3$ |

The current monitor circuitry 222 can monitor $I(r_s\ 230)$ and $I(r_s\ 228)$ and adjust the charge current provided by the charge controller circuitry 224 as follows. For example, when the maximum charge current of each of the batteries 130A, 130B, 130C, and 130D is the same and equal to $I_{max}$, and when the current monitor circuitry 222 monitors (senses) that $I(r_s\ 230)=3*I(r_s\ 228)/5$, the current monitor circuitry 222 will communicate this information to the charge controller circuitry 224, which will set the charge current to $4*I_{max}$.

Further, when the current monitor circuitry 222 monitors (senses) that $I(r_s\ 230)=0$, that is, when there is at least one fault 242, the current monitor circuitry 222 will communicate this information to the charge controller circuitry 224, which will set the charge current to $I_{max}$.

Additionally, when the current monitor circuitry 222 monitors (senses) that $I(r_s\ 230)=2I(r_s\ 228)/3$, that is, when there is at least one fault 244, or at least one fault 248, or at least one fault 250, the current monitor circuitry 222 will communicate this information to the charge controller circuitry 224, which will set the charge current to $3*I_{max}$. Also, when the current monitor circuitry 222 monitors (senses) that $I(r_s\ 230)=0.5*I(r_s\ 228)$, that is, when there is at least one fault 244, or at least one fault 248, or at least one fault 246, the current monitor circuitry 222 will communicate this information to the charge controller circuitry 224, which will set the charge current to $2*I_{max}$. As such, the current monitor circuitry 222 can control the controllable charge current circuitry 224 as a function of a ratio of the currents flowing through the sense resistors 228 and 230.

Table 4 summarizes the above relationships between $I(r_s\ 230)$, $I(r_s\ 228)$, and the charge current.

TABLE 4

| Fault | Measured current relationship | Charge current |
|---|---|---|
| No fault | $I(r_s\ 230) = 3*I(r_s\ 228)/4$ | $4*I_{max}$ |
| 240 | $I(r_s\ 230) = I(r_s\ 228)$ | $3*I_{max}$ |
| 242 | $I(r_s\ 230) = 0$ | $I_{max}$ |
| 244 | $I(r_s\ 230) = 2* I(r_s\ 228)/3$ | $3*I_{max}$ |
| 246 | $I(r_s\ 230) = 0.5\ I(r_s\ 228)$ | $2*I_{max}$ |
| 248 | $I(r_s\ 230) = 2* I(r_s\ 228)/3$ | $3*I_{max}$ |
| 250 | $I(r_s\ 230) = 2* I(r_s\ 228)/3$ | $3*I_{max}$ |

FIGS. 12-17 show different possible configurations of the sense resistors 228 and 230 within a battery arrangement such as the battery arrangement of FIG. 10. Common to all the configurations shown at FIGS. 12-17 (and also common to the configurations shown at FIGS. 4-11) is the fact that the sense resistors 228 and 230 have at least one three-branch node between them. Such three-branch nodes are shown at reference numerals 252 and 254 in FIGS. 12-17. Also common to all the configurations shown at FIGS. 12-17 (and also common to the configurations shown at FIGS. 4-11), is the fact that the sense resistors are on distinct current branches.

Figure 12:
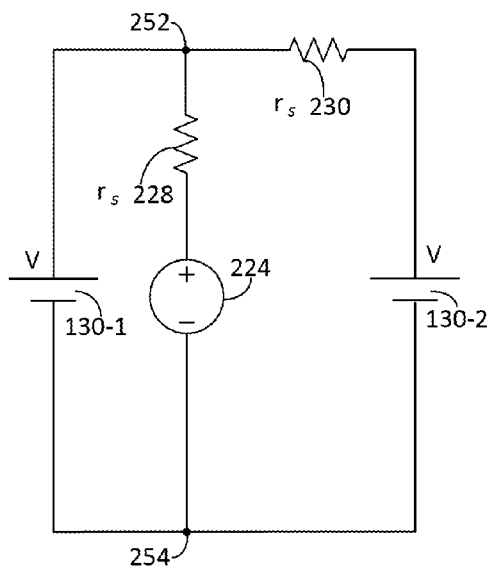
FIG. 12 shows a pair of closed loops from the general embodiment of FIG. 10.
Figure 13:
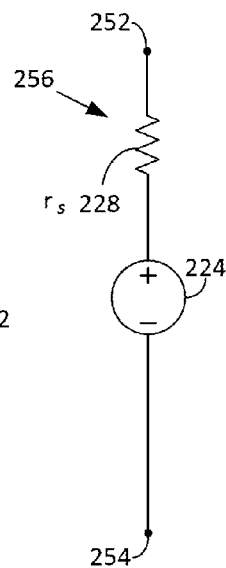
FIG. 13 shows a current branch take from the two closed loops of FIG. 12.
Figure 14:
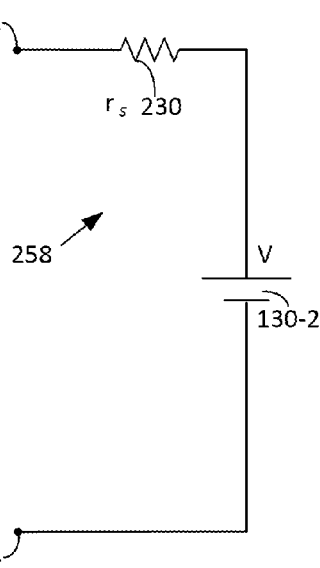
FIG. 14 shows another current branch take from the two closed loops of FIG. 12.

In FIG. 12, the sense resistors 228 and 230 have one of their ends directly electrically connected to each other at the three-branch node 252 and thus have the three-branch node 252 between them. Also in FIG. 12, the sense resistor 228 has one of its ends connected to the controllable charge circuitry 224, which is electrically connected to the three-branch node 254. The battery 130-2 is electrically connected to the three-branch node 254 and to the sense resistor 230. As such, the sense resistors 228 and 230 also have a second three-branch node, the three-branch node 254, between them. Further, in FIG. 12, the sense resistor 228 is on the current branch that spans nodes 252 and 254, and that includes the controllable charge current circuitry 224. The current branch in question is shown as current branch 256 in FIG. 13. Also in FIG. 12, the sense resistor 230 is on the current branch that spans the nodes 252 and 254, and that includes the battery 130-2. This current branch is shown as current branch 258 in FIG. 14. The current branch 256 is distinct from the current branch 258.

Figure 15:
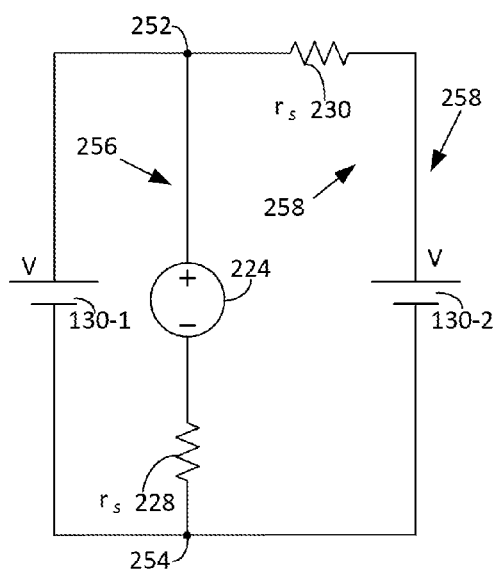
Figure 16:
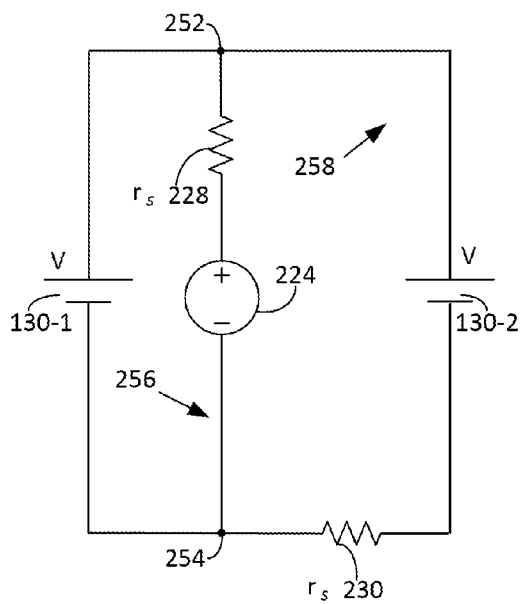

FIGS. 15-17 also show the sense resistors 228 and 238 separated from each other by the two, three-branch nodes 252 and 254. Further, FIGS. 15-17 show that the sense resistors are disposed (located) on different current branches, namely on the current branch 256 and current branch 258. Any other configurations having the sense resistors 228 and 230 on different current branches are also within the scope of the present disclosure.

FIGS. 18-21 show different possible configurations of the sense resistors 228 and 230 within a battery arrangement similar to that of FIG. 11, but with only two batteries 130-1 and 130-2. As in the embodiments of FIGS. 12, and 15-17, the sense resistors 228 and 220 in the embodiments of FIGS. 18-21 are separated from each other by two, three-branch nodes 252 and 254. Also as in the embodiments of FIGS. 12 and 15-17, each sense resistor in the embodiments of FIGS. 18-21 is on a distinct current branch: in the embodiments of FIGS. 18, 19, and 21, the sense resistor 228 is on the current branch 260 and the sense resistor 230 is on the current branch 262; in the embodiment of FIG. 20, the sense resistor 228 is on the current branch 260 and the sense resistor 230 is on the current branch 264. The current branches 260, 262, and 264 of the embodiment of FIG. 20 are shown by themselves in FIGS. 22, 23, and 24 respectively. Any other configurations having the sense resistors 228 and 230 on different current branches are also within the scope of the present disclosure.

FIG. 25 shows another embodiment of an arrangement of N batteries 130-1 to 130-N each having a respective voltage $V_1$-$V_N$. Each battery may have a voltage different than the other battery voltages. Similarly, each internal resistance of the batteries may be different than the other internal resistances. Further, in the present embodiment, the resistance of each sense resistor 228 and 230 does not have to be the same. In the present general embodiment, it can be shown, through principles of conservation of charge and energy in electrical circuits, e.g., through Kirchhoff's circuit laws, that it is possible to detect the occurrence of faults by measuring the electrical current flowing through the sense resistors 228 and 230.

Further, even though the embodiments described above referred to batteries (rechargeable batteries), any other suitable type of rechargeable electrical energy source may be used instead of, or in concert with, batteries. For example, capacitor-based electrical energy sources.

FIG. 26 shows the three battery arrangement of FIG. 5, but with the batteries not being recharged. In FIG. 26, the battery arrangement is electrically connected to a load 302 of the portable electronic device 100 of FIG. 1. In FIG. 26, a switching device 304 is open to disconnect the controllable charge current circuitry 224 and the sense resistor 228 from the batteries 130A, 130B, and 130C; a switching device 306 is set to disconnect the sense resistor 230 from the batteries 130A, 130B, and 130C, and to connect all three batteries in parallel. The switching devices 304 and 306 can be operationally connected to, and controlled by, the processor 102 of the portable electronic device 100, shown at FIG. 1. When the processor 102 detects that a charging device is being operationally connected to the portable electronic device, the switching device 304 can be opened, and the switching device 306 toggled to by-pass the sense resistor 230. The switching devices can include any suitable switch such as solid state switches and the like.

Figure 27:
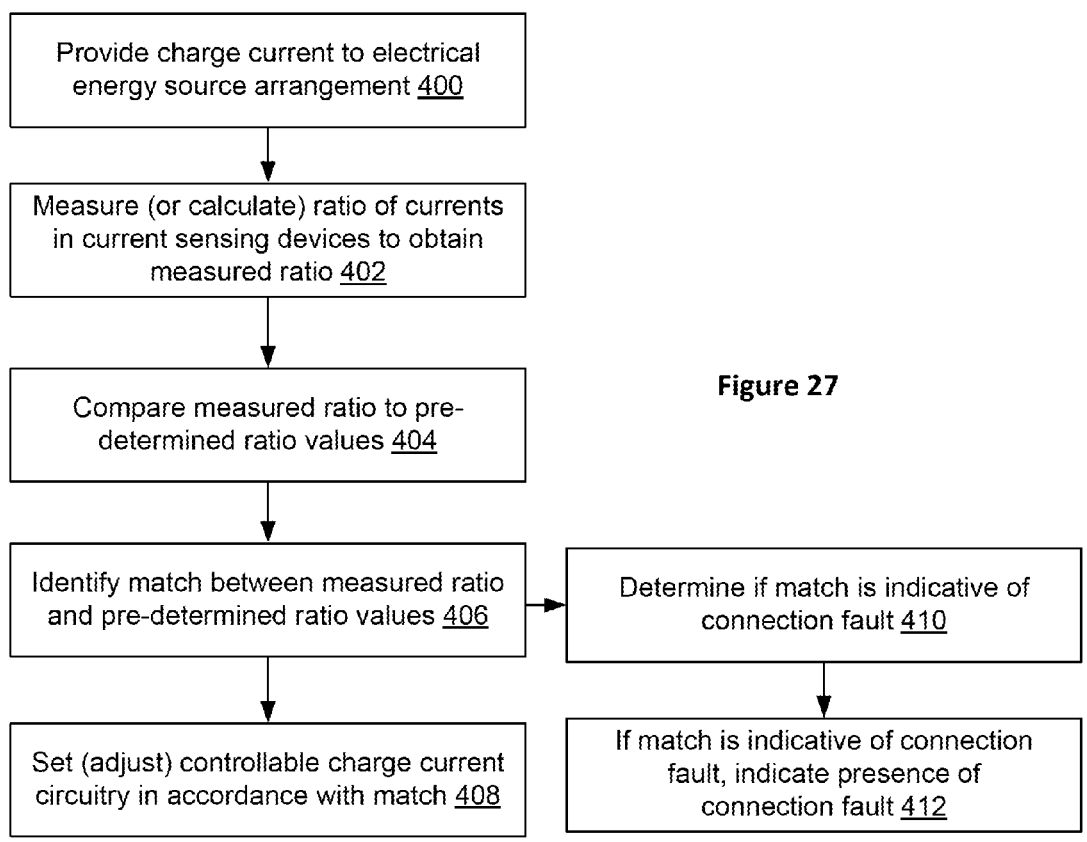
FIG. 27 shows a flowchart of a method according to certain examples of the present disclosure.

FIG. 27 shows a flowchart of a method according to certain examples of the present disclosure. At action 400, a charge current is provided to an electrical energy source arrangement such as, for example, the battery pack 129 of the portable electronic device 100 shown at FIG. 1. The electrical energy sources can be rechargeable batteries. Action 400 of FIG. 27 can include, or be preceded by, connecting the portable electronic device that contains the electrical energy source arrangement to a charger (charging device) and detecting, at the electronic device, that the charger has been connected. Action 400 can also include, or be preceded by, configuring the electrical energy source arrangement to allow charging of the electrical energy sources (e.g., batteries) by, for example, setting switching devices, such as, for example, the switching devices 304 and 306 shown at FIG. 26, to establish proper electrical connections to allow charging in accordance with the present disclosure.

At action 402, the ratio of currents in a pair of current sensing devices comprised in the electrical energy source arrangement is measured to obtain a measured ratio. The current sensing devices can be sense resistors (e.g., sense resistor 228 and 230 shown at FIGS. 10 and 11. The ratio can be measured at the output of a divider circuit comprised in current monitor circuitry.

At action 404, the measured ratio is compared to pre-determined ratio values. In general, a pre-determined value includes any value or range of values decided upon, explicitly or implicitly, at any time before the comparison 404. In a typical implementation, one or more pre-determined ratio values may be values that have been stored in memory, such as flash memory 108. Each pre-determined ratio value can be indicative of the presence of a particular fault in the electrical energy source arrangement, and thus indicate the maximum allowable charge current to be provided to the electrical energy source arrangement to charge the electrical energy sources safely.

At action 406, subsequent the comparison at action 404, a match is identified between the measured ratio and the pre-determined ratio values. The match indicates the maximum charge current that should be provided to the electrical energy source arrangement. If the current provided at action 400 is different than that maximum charge current indicated by the match of action 406, then, in accordance to the match, the charge current provided to the electrical energy source arrangement is set (adjusted), at action 408, to the maximum charge current value for this particular match.

The method of the present disclosure can also include an action 410 that determines, in accordance with the match determined at action 406, if there is a fault in the electrical energy source arrangement. If there is a fault, an indication (such as a notification that is visual, audible, tactile, or a combination thereof) can be provided or supplied to the user of the electrical energy source arrangement at action 412. When the electrical energy source arrangement is part of a portable electronic device such as portable electronic device 100 of FIG. 1, the indication can be provided in any suitable manner or form such as, for example, in the form of a message or pictogram displayed on the display 110, or in the form of an audible signal output at the speaker 118, or in the form of an haptic signal when the portable electronic device 100 is equipped with vibrating elements, or in any other suitable manner. By providing the indication to the user, the user can take action in terms of replacing or repairing the electronic device containing the electrical energy source arrangement.

Figure 28:
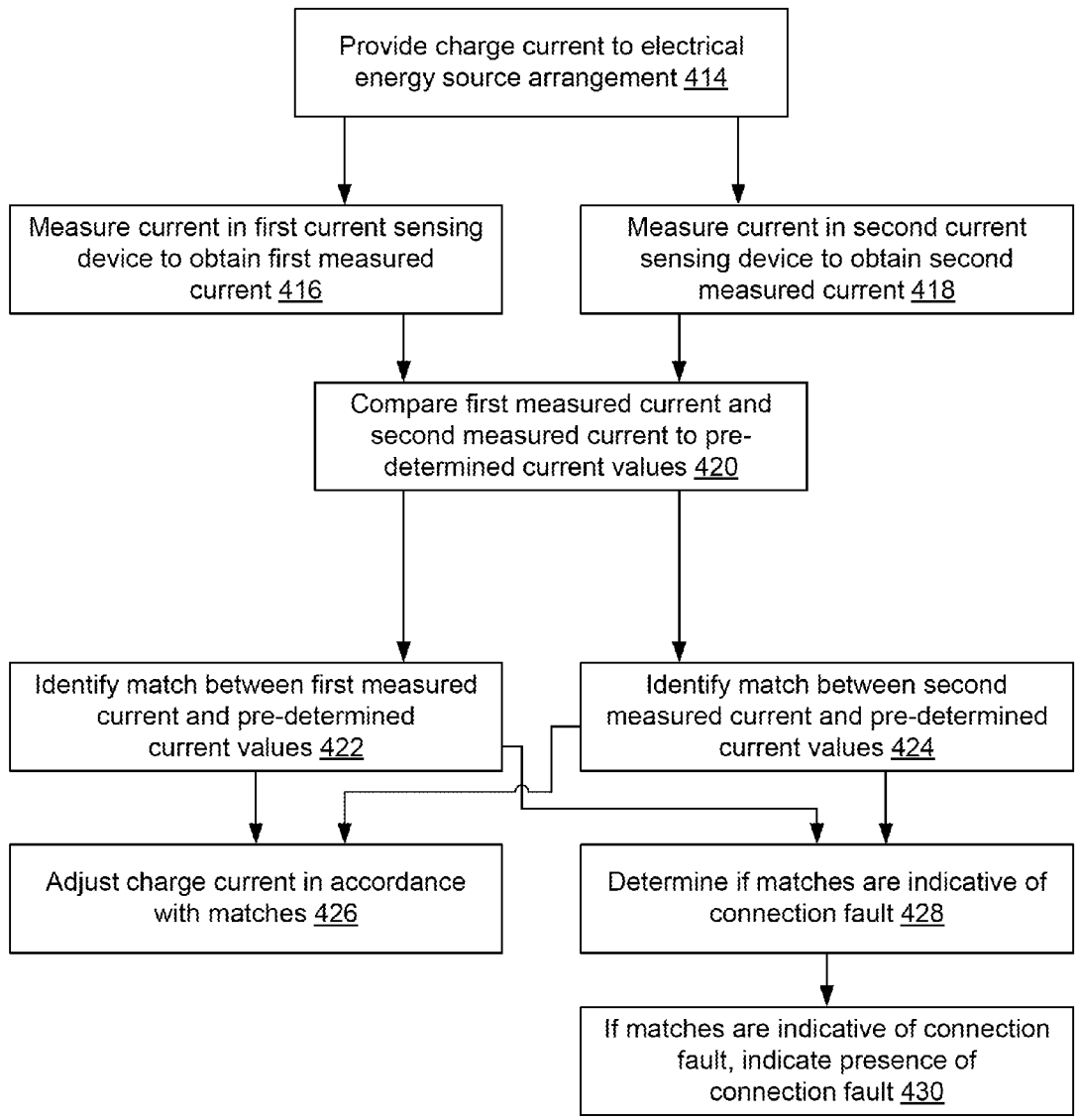
FIG. 28 shows a flowchart of a method according to certain other examples of the present disclosure.

FIG. 28 shows a flowchart of a method according to some examples of the present disclosure. At action 414, a charge current is provided to an electrical energy source arrangement such as, for example, the battery pack 129 of the portable electronic device 100 shown at FIG. 1. In some embodiments, the initial charge current can be set to the maximum charge current for a single electrical energy source. This mitigates the risk of providing an unsafe charge current in scenarios where faults (electrical connection faults) are present in the battery pack and only a single energy source is connected to the charger (the controllable charge current source 224). The electrical energy sources can be rechargeable batteries. Action 414 of FIG. 28 can include, or be preceded by, connecting the portable electronic device that contains the electrical energy source arrangement to a charger (charging device) and detecting, at the electronic device, that the charger has been connected. Action 414 can also include, or be preceded by, configuring the electrical energy source arrangement to allow charging of the electrical energy sources (e.g., batteries) by, for example, setting switching devices, such as, for example, the switching devices 304 and 306 shown at FIG. 26, to establish proper electrical connections to allow charging in accordance with the present disclosure.

At action 416, a current is measured in a first current sensing device to obtain a first measured current. At action 418, a current is measured in a second current sensing device to obtain a second measured current. The first and current sensing devices can be current sense resistors, Hall effect sensors, or any other suitable current sensing element across which a voltage drop is proportional to the electrical current traversing the current sensing element.

At action 420, the first measured current and the second measured current are compared to pre-determined current values. At action 422, a match between the first measured current and the pre-determined current values is identified. At action 424, a match between the second measured current and the pre-determined current values is identified.

If the current provided at action 414 is different than that maximum charge current indicated by the matches obtained at actions 422 and 424, then, in accordance with the matches, the charge current provided to the electrical energy source arrangement is set (adjusted), at action 426, to the maximum charge current value for this particular pair of matches.

At action 428, the matches obtained at actions 422 and 424 are used to determine if there is a fault (connection fault) in the electrical energy source arrangement. If there is a fault, an indication can be provided to the user of the electrical energy source arrangement at action 414. When the electrical energy source arrangement is part of a portable electronic device such as portable electronic device 100 of FIG. 1, the indication can be provided in any suitable manner or form such as, for example, in the form of a message or pictogram displayed on the display 110, or in the form of an audible signal output at the speaker 118, or in the form of an haptic signal when the portable electronic device 100 is equipped with vibrating elements, or in any other suitable manner. By providing the indication to the user, the user can take action in terms of replacing or repairing the electronic device containing the electrical energy source arrangement.

In the embodiments described above, it was shown how electrical connection faults can be detected during a charging operation of electrical energy sources, and how the charge current can be set to a safe charge current in accordance with the detected faults. As will be described below, in other embodiments, similar principles can be applied to detect electrical connection faults in an electrical circuit comprising electrical energy sources during a discharging operation of the electrical energy sources, i.e., when the electrical energy sources provide power to a load.

Figure 29:
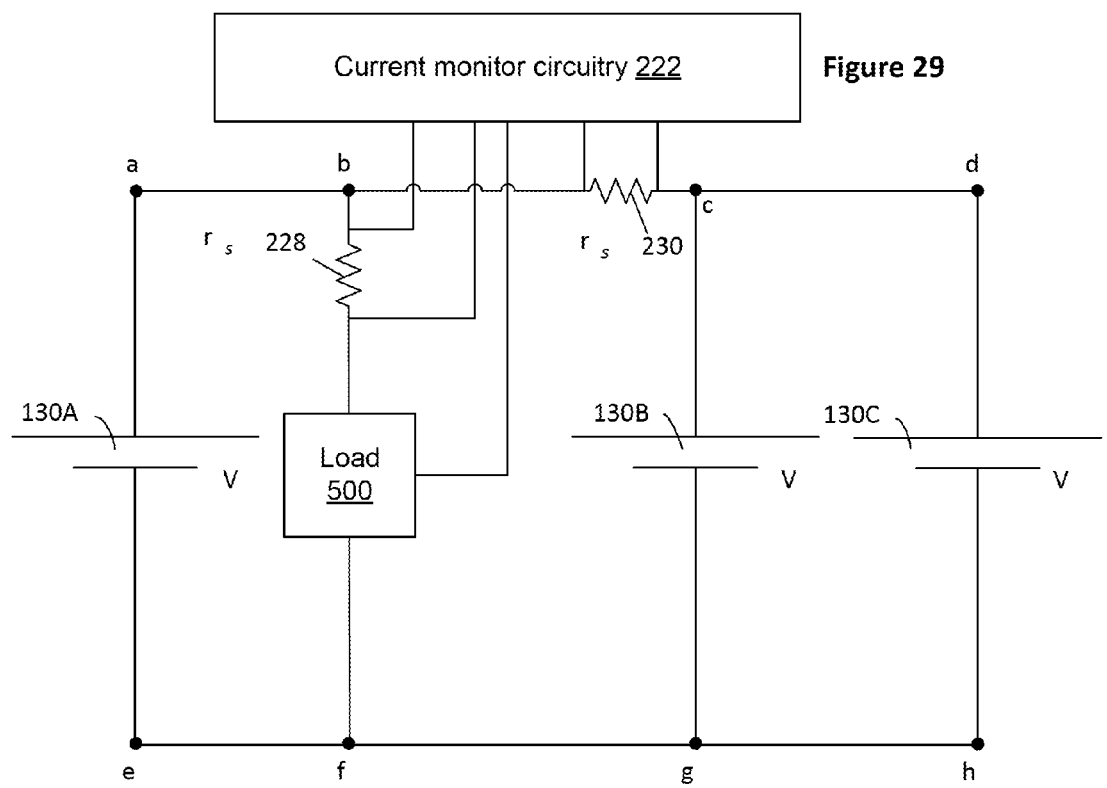
FIG. 29 shows an embodiment of with multiple batteries electrically connected to load.

FIG. 29 shows an embodiment of three batteries 130A, 130B, and 130C having the same nominal voltage value V. Each battery has the same internal resistance value (electrical series resistance). Sense resistors $r_{s1}$ 228 and $r_{s2}$ 230 are electrically connected to the batteries 130A, 130B, and 130C, which are electrically connected to a load 500 to provide a supply current to the load 500. For example, the load can be the elements of the portable electronic device 100 of FIG. 1, excluding the battery back 129.

Returning to FIG. 29, in accordance with Kirchhoff's circuit laws, it can be show that, in the example of FIG. 29, when a supply current is provided to the load 500, the current flowing through $r_s$ 230, $I(r_s\ 230)$, is equal to two thirds the current flowing through $r_s$ 228, $I(r_s\ 230)$. That is, when the voltage of each of the batteries 130A, 130B, and 130B have the same value, and when the internal resistance of each of the three batteries is the same, then $I(r_s\ 230)=2*I(r_s\ 228)/3$.

Also shown in FIG. 29 are three closed loops, namely the closed loop defined by the nodes a-b-f-e, the closed loop defined by the nodes b-c-g-f, and the closed loop defined by the nodes c-d-h-g. A closed loop can also be referred to as Kirchhoff loop. As such, the embodiment of FIG. 29 shows that the load 500, the sense resistor 228, the sensor resistor 230, the battery 130A, and the battery 130B are electrically connected to each other and define a first closed loop (a-b-f-e) and a second closed loop (b-c-g-f). In the present embodiment, the first closed loop (a-b-f-e) comprises the load 500, the sense resistor 228, and the battery 130A. Also in the present embodiment, the second closed loop (b-c-g-f) comprises the load 500, the sense resistor 228, the sense resistor 230, and the battery 130B. The sense resistor 228 and the sense resistor 230 or on different (distinct) current branches.

Figure 30:
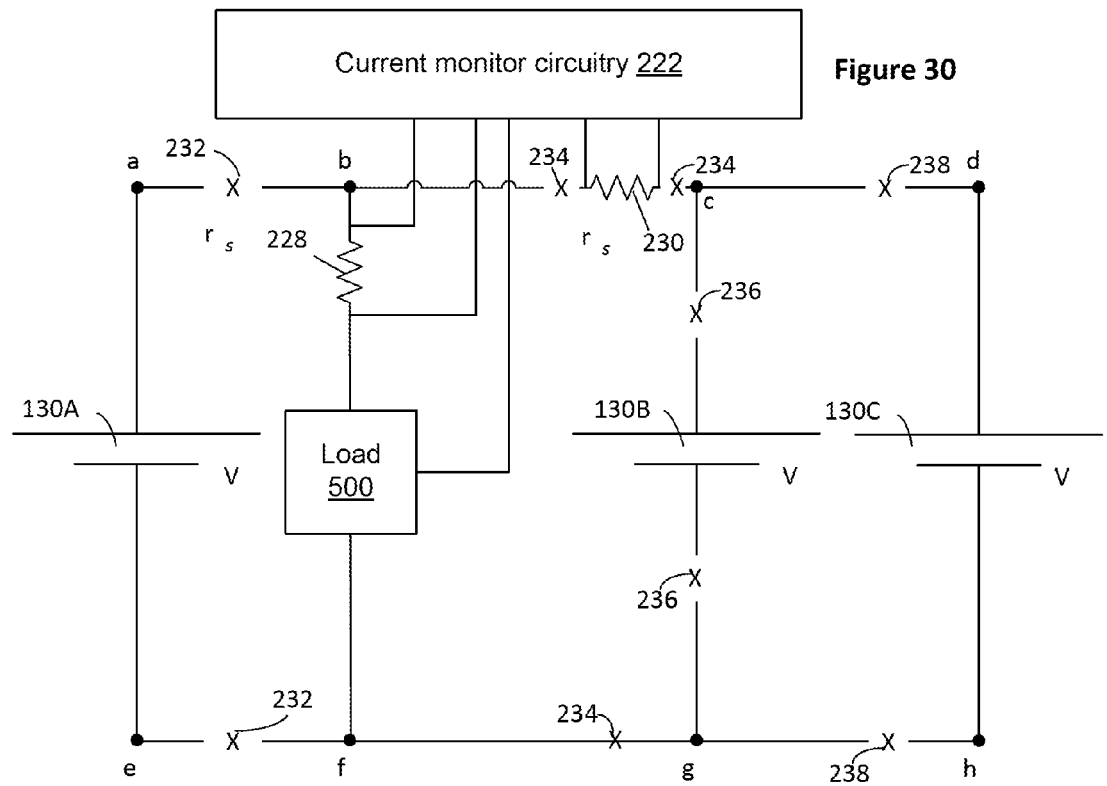
FIG. 30 shows the embodiment of FIG. 30 with multiple possible connection faults.

FIG. 30 shows the battery arrangement of FIG. 29 but with electrical connection faults 232, 234, 236, and 238. Using Kirchhoff's laws, it can be shown that when one or more of these faults are present, the relationship between the currents flowing through the sense resistors 228 and 230 are as reported in Table 5.

TABLE 5

| Fault | Current relationship |
|---|---|
| No fault | $I(r_s\ 230) = 2*I(r_s\ 228)/3$ |
| 232 | $I(r_s\ 230) = I(r_s\ 228)$ |
| 234 | $I(r_s\ 230) = 0$ |
| 236 | $I(r_s\ 230) = 0.5\ I(r_s\ 228)$ |
| 238 | $I(r_s\ 230) = 0.5\ I(r_s\ 228)$ |
| 232 and 236 | $I(r_s\ 230) = I(r_s\ 228)$ |
| 232 and 238 | $I(r_s\ 230) = I(r_s\ 228)$ |

The current monitoring circuitry 222 can monitor $I(r_s\ 230)$ and $I(r_s\ 228)$ continuously, periodically, or in any other suitable way. In accordance with (as a function of) the monitored currents $I(r_s\ 230)$ and $I(r_s\ 228)$, the current monitoring circuitry 222 can provide commands to the load 500. For example, when any fault is detected, the current monitoring circuitry can control the load 500 to reduce its power consumption in order to delay the next battery charging operation. In turn, the load 500 can turn off, or use less frequently, some of its components. As an example, in the case of portable electronic device such as that shown at FIG. 1, upon receiving notification from the current monitoring circuitry, the processor 102 can to turn off the radio frequency communication subsystem 104, or reduce the display intensity of the display 110. Additionally, the processor can display a warning on the display 110 to advise the user that a fault in the battery pack has occurred and that servicing might be required.

As will be understood by the skilled worker, the controllable charge current source 224 shown in the embodiments of FIGS. 10-26 can be replaced by the load 500 shown in the embodiments of FIGS. 29-33 to arrive at other embodiments that regard the detection of electrical connection faults in electrical circuits comprising electrical energy sources, during a discharging operation of the electrical energy sources, i.e., when the electrical energy sources provide power to a load.

In other embodiments, the batteries 130A, 130B, and 130C, can be substituted with any other suitable electrical energy sources such as, for example, fuel cells, solar cells, and the like. In such an embodiment where the batteries 130A, 130B, and 130C are replaced by fuel cells, the load can include a battery being charged by the fuel cells, and a power converter disposed between the fuel cells and the battery. The power converter converts an input current level provided by the fuel cells into an output current level that is provided to the battery to charge the battery. The power converter can be set, by the current monitoring circuitry 222, to convert the current level provided by the fuel cells to the current level required to charge the battery.

Figure 31:
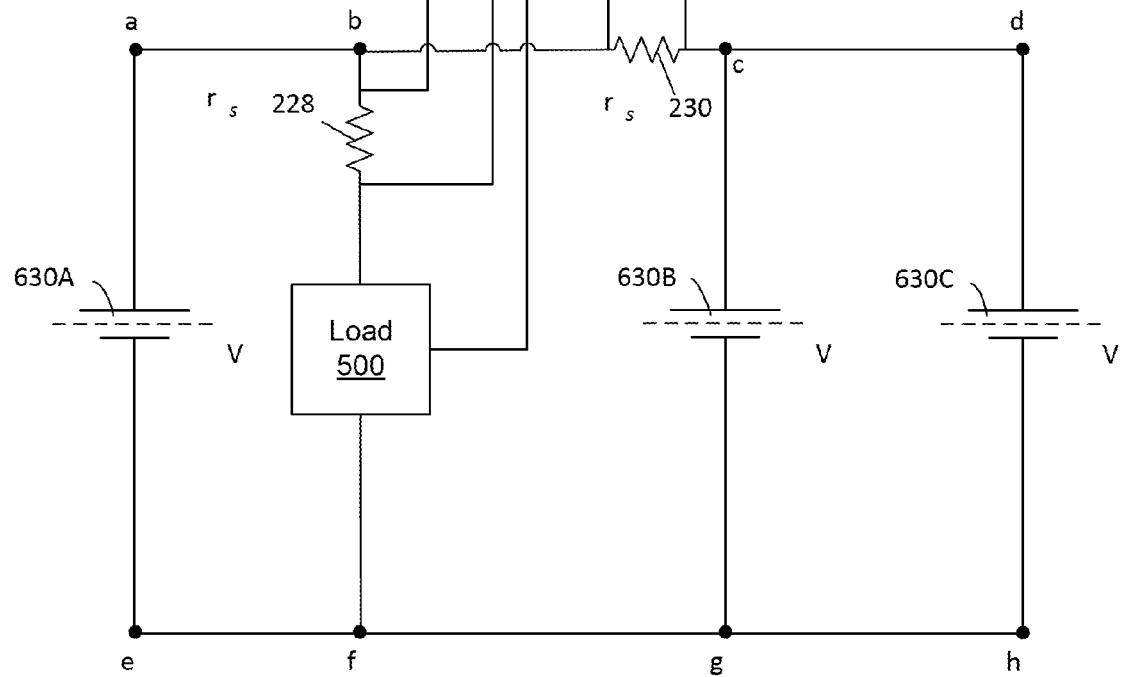
FIG. 31 shows an embodiment of multiple fuel cells electrically connected to load.
Figure 32:
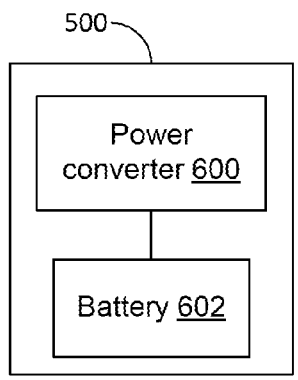
FIG. 32 shows an embodiment of a load.
Figure 33:
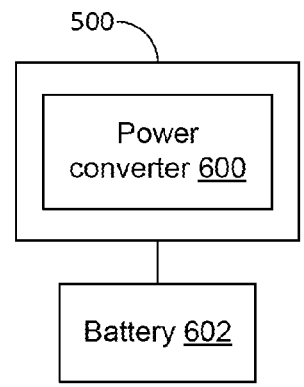
FIG. 33 shows another embodiment of a load electrically connected to a battery.

FIG. 31 shows the arrangement of FIG. 29 but with the batteries 130A, 130B, and 130C having been replaced with fuel cells 630A, 630B, and 630C. FIG. 32 shows the load 500, which, in the present embodiment comprises a power converter 600 and a battery 602 that is to be charged by a charge current provided by the power converter 600. FIG. 33 shows a variant of the load shown at FIG. 32. In FIG. 33, the load 500 is simply the power converter 600, which is electrically connected to the battery 600 to provide a charge current thereto.

When no connection faults are present in the fuel cell arrangement of FIG. 31, the fuel cells 630A, 630B, and 630C will together provide an input current ($I_1$) to the load 500. The power converter 600, which, when nominally set to convert the input current $I_1$, will convert $I_1$ into the pre-determined (target) charge current ($I_{target}$) of the battery 602. That is, t the power converter 600 converts $I_1$ into $I_{target}$. If, for example, a connection fault that disconnects the fuel cell 630A from the other elements of the arrangement of FIG. 31 and the fuels cells provide a current equal to $2*I_1/3$, the current monitor circuitry 222 will notify the load 500 of this fault and the power converter 600 will change its conversion settings such that the power converter 600 converts $2*I_1/3$ into $I_{target}$.

In general, and in the context of the present disclosure, two components are "electrically connected" when an electrical change caused by or affecting one (such as a change in voltage or current) can result in an electrical change in the other, or when an electrical signal sent by one can be received by the other. The two components need not be directly electrically connected (that is, there may be other elements interposed between them), and they may be, but need not be, proximate to one another. "Electrically connected" also includes the concept that components may be physically connected but the electrical circuit connections between them may be broken or completed by, for example, switching circuitry.

In some embodiments of the present disclosure, the electronic device that is powered by a battery pack effectively seals the battery pack within its housing. That is, in those embodiments, the battery pack is not accessible to the user of the electronic device without particular tools and equipment. In such embodiments, as removal of the battery pack cannot generally be effected by the user, a simple substitution of the battery pack with a fresh battery pack is not possible in situations where the user observes inadequate battery lifetime or excessive charge time. Advantageously, the present disclosure allows the user to be notified when faults (electrical connection faults) are detected during charging of the electronic device. Upon receiving such notifications, the user can make appropriate plans such as servicing the electronic device. A further potential advantage is the techniques described herein can be applied to a variety of portable electronic devices, power systems and energy sources. In the case of portable electronic devices in general, and handheld devices in particular, the techniques described herein can be implemented with low cost in terms of added size or weight. Further, the potential for improved safety that may be afforded may be in addition to, and may act in cooperation with, other safety features.

In the preceding description, for purposes of explanation, numerous details are set forth in order to provide a thorough understanding of the embodiments of the disclosure. However, it will be apparent to one skilled in the art that these specific details are not required in order to practice the disclosure. In other instances, well-known electrical structures and circuits are shown in block diagram form in order not to obscure the disclosure. For example, specific details are not provided as to whether the embodiments of the disclosure described herein are implemented as a software routine, hardware circuit, firmware, or a combination thereof.

Embodiments of the disclosure can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described disclosure can also be stored on the machine-readable medium. Software running from the machine-readable medium can interface with circuitry to perform the described tasks.

The above-described embodiments of the disclosure are intended to be examples only. Alterations, modifications and variations can be effected to the particular embodiments by those of skill in the art without departing from the scope of the disclosure, which is defined solely by the claims appended hereto.

What is claimed is:

1. A portable electronic device comprising:
   electrical energy sources;
   a first current sensor;
   a second current sensor;
   an electrical current source; and
   current monitoring circuitry, the electrical current source, the first current sensor, the second current sensor, a first electrical energy source, and a second electrical energy source being electrically connected to each other and defining a first closed loop and a second closed loop,
      the first closed loop comprising the electrical current source, the first current sensor, and the first electrical energy source,
      the second closed loop comprising the second electrical energy source,
         the second current sensor being comprised in the first closed loop or in the second closes loop, the first current sensor and the second current sensor being on different current branches,
      the current monitoring circuitry being electrically connected to the first current sensor and to the second current sensor to sense a first electrical current flowing through the first current sensor and a second electrical current flowing through the second current sensor, the current monitoring circuitry to control the electrical current source to provide an output current as a function of only the first and second electrical currents.

2. The portable electronic device of claim 1 wherein the output current is a function of a ratio of the first electrical current to the second electrical current.

3. The portable electronic device of claim 1 wherein an electrical current flowing through each of the electrical energy sources is equal to, or less than, a pre-determined maximum charge current for each respective electrical energy source.

4. The portable electronic device of claim 1 wherein the first current sensor and the second current sensor are selected from the group consisting of sense resistors and Hall effect sensors.

5. The portable electronic device of claim 1 wherein the electrical energy sources include rechargeable batteries.

6. The portable electronic device of claim 1 wherein the electrical energy sources include capacitors.

7. A portable electronic device comprising:
   rechargeable batteries;
   a first current sensor;
   a second current sensor;
   an electrical current source; and
   current monitoring circuitry, the electrical current source, the first current sensor, the second current sensor, a first rechargeable battery, and a second rechargeable battery being electrically connected to each other and defining a first closed loop and a second closed loop,
      the first closed loop comprising the electrical current source, the first current sensor, and the first rechargeable battery,
      the second closed loop comprising the second rechargeable battery,
         the second current sensor being comprised in the first closed loop or in the second closes loop, the first current sensor and the second current sensor being on different current branches,
      the current monitoring circuitry being electrically connected to the first current sensor and to the second current sensor to sense a first electrical current flowing through the first current sensor and a second electrical current flowing through the second current sensor, the current monitoring circuitry to control the electrical current source to provide an output current as a function of only the first and second electrical currents.

8. The portable electronic device of claim 7 wherein the output current is a function of a ratio of the first electrical current to the second electrical current.

9. The portable electronic device of claim 7 wherein an electrical current flowing through each of the rechargeable batteries is equal to, or less than, a pre-determined maximum charge current for each respective rechargeable battery.

10. The portable electronic device of claim 7 wherein the first current sensor and the second current sensor are selected from the group consisting of sense resistors and Hall effect sensors.

11. A portable electronic device comprising:
    rechargeable batteries;
    a first sense resistor;
    a second sense resistor;
    a controllable charge current source; and
    current monitoring circuitry, the electrical current source, the first sense resistor, the second resistor, a first rechargeable battery, and a second rechargeable battery being electrically connected to each other and defining a first closed loop and a second closed loop,
       the first closed loop comprising the controllable charge current source, the first sense resistor, and the first rechargeable battery,
       the second closed loop comprising the second rechargeable battery, the second sense resistor being comprised in the first closed loop or in the second closes loop, the first current sensor and the second current sensor being on different current branches, the current monitoring circuitry being electrically connected to the first sense resistor and to the second sense resistor to sense a first electrical current flowing through the first sense resistor and a second electrical current flowing through the second sense resistor, the current monitoring circuitry to control the controllable charge current source to provide an output current as a function of only the first and second electrical currents.

12. The portable electronic device of claim 11 wherein the output current is a function of a ratio of the first electrical current to the second electrical current.

13. The portable electronic device of claim 11 wherein an electrical current flowing through each of the rechargeable batteries is equal to, or less than, a pre-determined maximum charge current for each respective rechargeable battery.

* * * * *